Bundel & Williams.
Seed-Planter.

N⁰ 72971. Patented Jan. 7, 1868.

Sheet 2.
2 Sheets.

Witnesses.

Inventors.
Henry Bundel & James Williams.
By their attorney A.B. Stoughton

United States Patent Office.

HENRY BUNDEL AND JAMES WILLIAMS, OF DAYTON, OHIO.

Letters Patent No. 72,971, dated January 7, 1868.

IMPROVEMENT IN SEED-PLANTING MACHINES.

*The Schedule referred to in these Letters Patent and making part of the same.*

TO ALL WHOM IT MAY CONCERN:

Be it known that we, HENRY BUNDEL and JAMES WILLIAMS, of Dayton, in the county of Montgomery, and State of Ohio, have invented certain new and useful Improvements in Seed-Planting Machines; and that the following is a full, clear, and exact description of the same, reference being had to the accompanying drawings, making a part of this specification, in which—

Similar letters of reference where they occur in the separate figures denote like parts of the machine in all of the drawings.

Our invention relates to the arrangement of devices by which we hang, raise, hold up, and let down the shoes or hoes, and their connection with the main frame.

To enable others skilled in the art to make and use our invention, we will proceed to describe the same with reference to the drawings.

Figure 1:
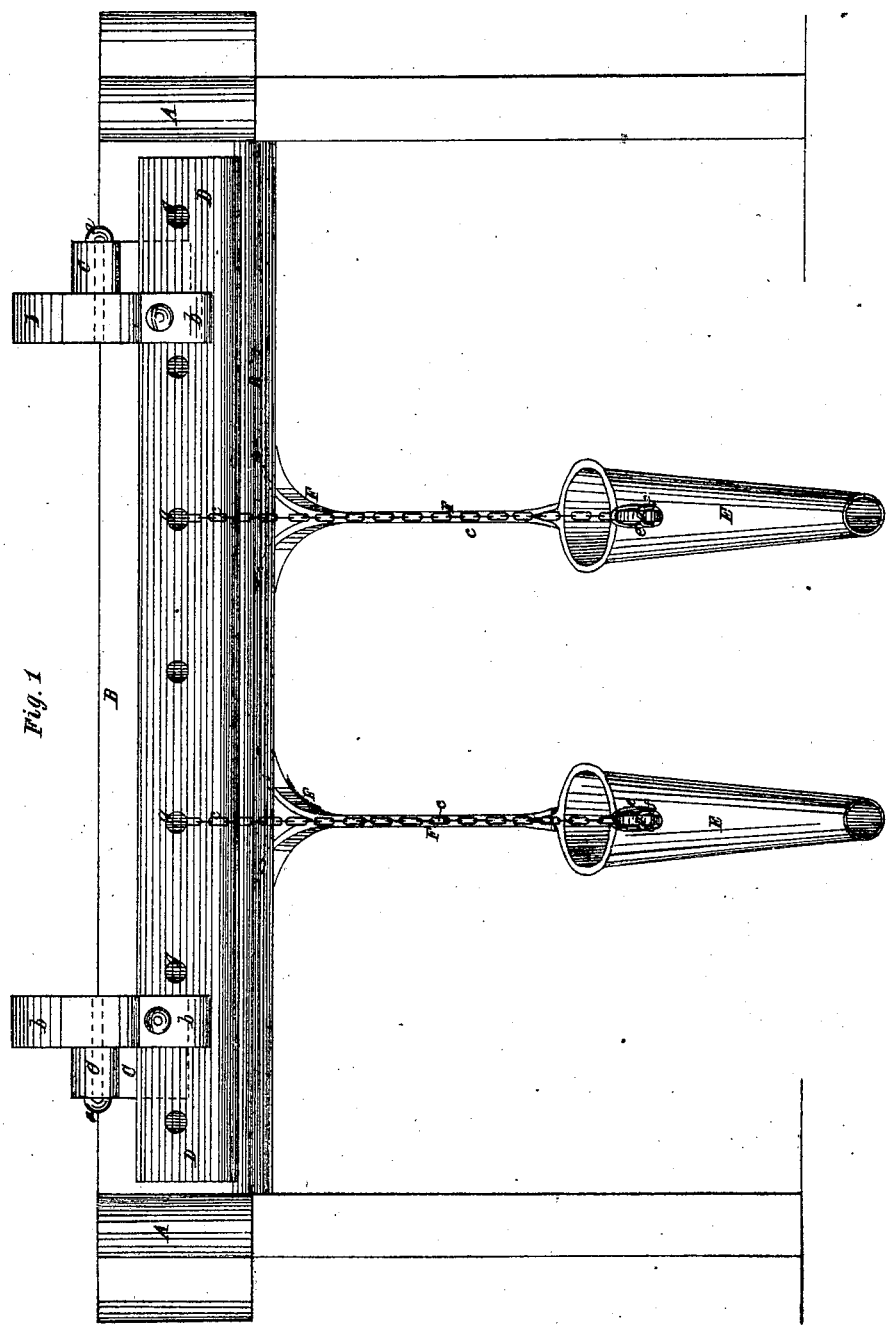
Figure 1 represents a rear elevation of so much of a seed-planting machine as will illustrate our invention.
Figure 2:
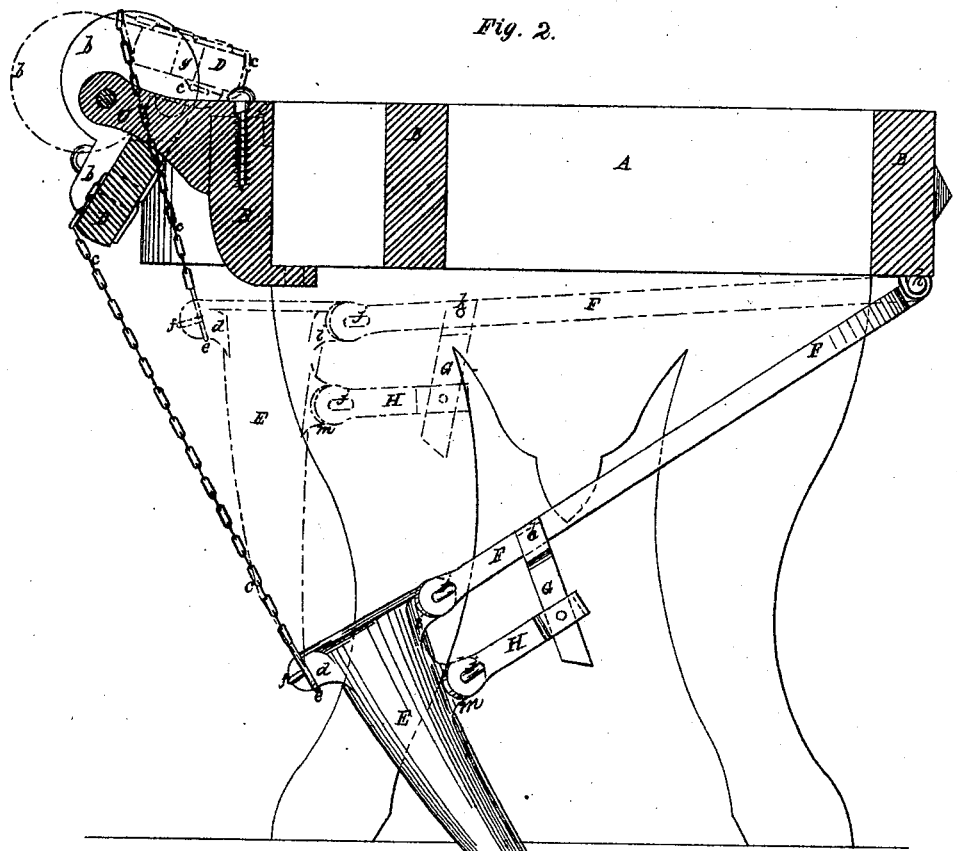
Figure 2 represents a transverse vertical section through the same.
Figure 3:
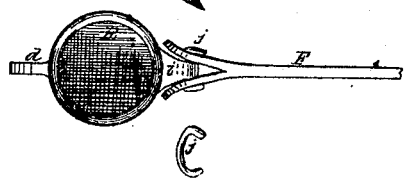
Figure 3 represents a top plan of one of the shoes or hoes, and its connection with its drag-bar.

A represents the longitudinal, and B the cross-timbers of the main frame. On the rear cross-timber B, we arrange two arms or brackets, C C, which project rearward therefrom, and having in their outer ends openings through which pivot-pins $a$ $a$ pass. These arms C are firmly secured to the timber B, as shown in fig. 2. D is the lifting-bar, upon which are secured two hubs, arms, or bracket-wheels or disks, $b$ $b$, into which the pivots $a$ $a$, after passing through the arms C C, are screwed or otherwise fastened or secured, to form the hinge-joints, on which the lifting-bar is swung and is supported. When the lifting-bar D is raised up and turned over towards or upon the main frame, it, as well as the parts connected to and moving with it, will assume the positions shown in red lines in fig. 2, and will there remain, as the chains and shoes or hoes connected thereto are in front of the pivots $a$, and their weight tends to hold the bar there. When the shoes E, of which there may be any suitable number, are let down, as shown in black lines in said figure, then their chains $c$, and the weight upon them, are in rear of the pivoted joint, and their tendency is to hold the bar D in that position. The bar D may be raised by a lever, handle, or rod, suitably connected thereto. The chains $c$, which are attached at their lower ends to the lugs $d$ on the shoes or hoes, by a link, $e$, passing over the lug, and a bent wire or key, $f$, passing through a hole in the lug behind said link, are fastened at their upper ends to the lifting-bar by means of holes $g$ therein, and as the bar is raised up and let down, the chains wind around or unwind from said bar, as shown in fig. 2 by the red and black lines therein. F is the drag-bar, there being one for each shoe or hoe. This drag-bar is pivoted at its front end to the front of the main frame, as at $h$, and its rear end is forked, as seen in fig. 3, so as to straddle the lug $i$ on the front of its shoe or hoe, and a bent pin or key, $j$, passes through the forks and the lug, to hold it, and admit of slight lateral motion on the pin, which avoids sudden jars, and breakage under certain circumstances. On the drag-bar, at $k$, is fastened a downwardly-projecting arm, G, to which is fastened one end of an auxiliary drag-bar, H, the other end thereof being attached to a second and lower lug, $m$, on the shoe or hoe. The usual breaking or "give-way" connection between the drag-bar and shoe may be used, so that when the shoe strikes any very rigid and unyielding obstruction it may break said connection and swing back, and thus avoid greater damage to the machine.

We have only shown and described so much of the machine as illustrates our invention. The parts not shown may be of any of the usual well-known constructions.

Having thus fully described our invention, what we claim therein as new, and desire to secure by Letters Patent, is—

In combination with the lifting-bar D, for raising, supporting, or lowering the shoes, the arms or brackets $c$ $b$, for forming its hinged connection with the main frame, substantially as and for the purposes herein described and represented.

HENRY BUNDEL,
JAMES WILLIAMS.

Witnesses:
JAMES TURNER,
W. HAL. SIGMARE.